(12) United States Patent
Karan

(10) Patent No.: US 11,182,570 B1
(45) Date of Patent: Nov. 23, 2021

(54) TAMPER EVIDENT IDENTIFICATION CARD AND METHOD OF FABRICATING SAME

(71) Applicant: Aharon A. Karan, Glendale, WI (US)

(72) Inventor: Aharon A. Karan, Glendale, WI (US)

(*) Notice: Subject to any disclaimer, the term of this patent is extended or adjusted under 35 U.S.C. 154(b) by 0 days.

(21) Appl. No.: 16/986,693

(22) Filed: Aug. 6, 2020

(51) Int. Cl.
*G06K 19/00* (2006.01)
*G06K 1/12* (2006.01)
*G06K 19/06* (2006.01)

(52) U.S. Cl.
CPC ......... *G06K 1/12* (2013.01); *G06K 19/06028* (2013.01); *G06K 19/06037* (2013.01)

(58) Field of Classification Search
CPC ... G06K 1/12; G06K 19/07703; G06Q 20/355
USPC .......................................................... 235/487
See application file for complete search history.

(56) References Cited

U.S. PATENT DOCUMENTS

| | | | |
|---|---|---|---|
| 5,373,656 A | 12/1994 | Merser | |
| 5,560,657 A | 10/1996 | Morgan | |
| 5,799,425 A | 9/1998 | Merser et al. | |
| 5,826,775 A | 10/1998 | Mooney et al. | |
| 6,694,653 B2 | 2/2004 | Bradfield et al. | |
| 8,381,991 B2 | 2/2013 | Atherton | |
| 10,255,830 B2 | 4/2019 | Karan | |
| 10,565,901 B2 | 2/2020 | Karan | |
| 2001/0022280 A1 | 9/2001 | Kannabiran et al. | |
| 2005/0178037 A1 | 8/2005 | Kunreuther | |
| 2008/0048030 A1 | 2/2008 | Garner | |
| 2009/0121010 A1 | 5/2009 | Ireland et al. | |
| 2009/0278343 A1* | 11/2009 | Fischer | B42D 15/0073 281/17 |
| 2011/0031148 A1 | 2/2011 | Rosendall et al. | |
| 2012/0319393 A1* | 12/2012 | Fischer | B42D 25/00 283/62 |
| 2012/0326429 A1* | 12/2012 | Fischer | B42D 25/47 283/75 |
| 2017/0300790 A1* | 10/2017 | Herslow | B32B 37/025 |
| 2019/0275563 A1* | 9/2019 | Semeniuk | B07C 3/00 |

* cited by examiner

*Primary Examiner* — Ahshik Kim
(74) *Attorney, Agent, or Firm* — Boyle Fredrickson, S.C.

(57) ABSTRACT

A method of fabricating an identification card for an individual is provided. The method includes the steps of storing items of information associated with the individual on a memory and providing the identification card with inner and outer layers laminated to each other. The memory is operatively connected to a printer and at least one selected item of information is on a first portion of the inner layer of the tag. A second portion of the inner layer of the tag is removed and a first portion of the outer layer is folded over and affixed to the first portion of the inner layer such that the first portion of the inner layer is captured between the first portion of the outer layer and a second portion of the outer layer.

22 Claims, 4 Drawing Sheets

TAMPER EVIDENT IDENTIFICATION CARD AND METHOD OF FABRICATING SAME

FIELD OF THE INVENTION

This invention relates generally to identification documents, and in particular, to an identification card wherein the tampering or altering thereof is evident and a method of fabricating the same.

BACKGROUND AND SUMMARY OF THE INVENTION

In today's society, identification documents, such as identification cards, are utilized on a daily basis for a variety of reasons. For example, high schools and universities will issue identification cards that allow students to verify their status at a school and to obtain access to facilities or services at the school. Similarly, businesses often will provide identification cards to their employees which verify their status as employees of the business and allows the employees access to a selected area of a facility at which the employees work.

As is known, identification cards display thereon certain items of information which relate to the identity of the bearer. By way of example, an information card will often display an individual's name, address, birth date, signature, a photographic image of the individual and biometric information associated with the person whose image appears in the photographic image (e.g., a fingerprint). In addition, the information card may display an identification code personalized to the individual, as well as, a machine-readable optical label, such as a matrix barcode, that points to a database containing information about the individual.

Typically, identification cards include a substrate having the information related to the identity of the bearer printed on one or both sides thereof. Each side of the substrate is coated and/or laminated with a transparent layer of protective material, such as a clear polycarbonate or polyvinyl chloride (PVC), biaxially oriented polyester, or other optically clear durable plastic film, to prevent tampering to the information printed on the substrate. By way of example, Annenberg, U.S. Pat. No. 3,758,970 discloses an identification or credit card structure which includes a photographic likeness of an individual, as well as, printed information relating to the individual. The card is comprised of three layers of plastic material with the printed information printed in reverse on the back side of the uppermost layer of plastic. The photographic likeness may be on conventional photographic paper or may be imprinted directly on a plastic panel. When imprinted on a plastic panel, the photograph is fused into the overall card structure upon lamination to form a tamper-proof, solid plastic card.

While functional for their intended purposes, fabricating these prior identification cards can be expensive and time consuming. Further, prior identification cards are susceptible to tampering by removal of one or both of the transparent layers of protective material coating laminated to the substrate. For example, a counterfeiter may remove one or both of the transparent layers with the aid of heat, thereby gaining access information printed on the substrate. Once access is gain to the substrate, the counterfeiter can alter the printed information thereon and recoat or re-laminate the sides of the substrate with transparent layers of protective material.

In view of the foregoing, it is primary object and feature of the present invention to provide an identification card wherein the tampering or altering thereof is evident and a method of fabricating the same.

It is a further object and feature of the present invention to provide an identification card wherein the tampering or altering thereof is evident that allows a user to simple and easily customize information printed thereon.

It is a further object and feature of the present invention to provide an identification card wherein the tampering or altering thereof is evident that is simple and inexpensive to manufacture.

In accordance with the present invention, a method of forming an identification card for an individual is provided. The method includes the step of operatively connecting an input device to a computer executing a program stored in a non-transient medium. Selected items of information associated with the individual are inputted to the computer with the input device. The selected items of information are stored on the memory associated with the computer. The identification card is provided with inner and outer layers laminated to each other. Identification information identifying the individual is printed on a first portion of the inner layer of the tag in response to a signal received by a printer from the computer. A second portion of the inner layer of the tag is removed to expose an adhesive on a first portion of the outer layer and a first portion of the outer layer is folded over the first portion of the inner layer so as to capture the first portion of the inner layer between the first portion of the outer layer and a second portion of the outer layer.

At least one of the first and second portions of the outer layer is transparent such that the printing on the first portion of the inner layer is visible through the outer layer of the identification card. The first portion of the inner layer is bound to the second portion of the outer layer by the adhesive. The second portion of the inner layer has a non-binding layer of material affixed thereto. The material is one of silicone and wax.

The selected items of information include at least one of a name, an address, a birth date, a signature, a social security number, a student number, a passport number, a photographic image of the individual and biometric information associated with the individual. The identification information includes at least one of a barcode, a matrix code, a quick response code, and a unique alphanumeric code pointing to the memory associated with the computer wherein the selected items of information are stored. In addition, the identification information may include at least one of a name, an address, a birth date, a signature, a student number, a photographic image of the individual and biometric information associated with the individual.

In accordance with a further aspect of the present invention, a method of fabricating an identification card for an individual is provided. The method includes the step of associating a unique code with at least one of a name, an address, a birth date, a signature, a social security number, a student number, a passport number, a photographic image of the individual and biometric information of the individual. The unique code is printed on a first portion of an inner layer of the identification card. The first portion of the inner layer is bonded to a first portion of an outer layer of the identification card. A second portion of the inner layer is removed from a second portion of the outer layer to expose an adhesive on the second portion of the outer layer. The exposed adhesive contacts the first portion of the inner layer so as to capture the first portion of the inner layer between first and second portions of the outer layer.

The first and second portions of the outer layer are transparent. The second portion of the inner layer is coated with a releasable, non-binding agent, e.g., silicone. The first portion of the inner layer is free of the releasable, non-binding agent. The unique code is at least one of a barcode, a matrix code, a quick response code, and a unique alphanumeric code. The method may also include the additional step of printing at least one of the name, the address, the birth date, the student number, the photographic image of the individual and the biometric information associated with the individual.

In accordance with a still further aspect of the present invention, a method of fabricating an identification card for an individual is provided. The method includes the step of storing items of information associated with the individual on a memory. The identification card is provided with inner and outer layers laminated to each other. The memory is operatively connected to a printer and the printer prints at least one selected item of information on a first portion of the inner layer of the tag. A second portion of the inner layer of the identification card and a first portion of the outer layer is folded over the first portion of the inner layer such that the first portion of the inner layer is positioned between the first portion of the outer layer and a second portion of the outer layer. The first portion of the outer layer is then affixed to the first portion of the inner layer.

An adhesive may be affixed on the first portion of the outer layer and a non-binding layer of material is affixed to the inner surface of the second portion of the inner layer. The material is one of silicone and wax. The items of information include at least one of a name, an address, a birth date, a signature, a social security number, a student number, a passport number, a photographic image of the individual and biometric information associated with the individual and the at least one selected item of information is selected from the group consisting of the name, the address, the birth date, the signature, the student number, the photographic image of the individual and the biometric information associated with the individual, At least one of a barcode, a matrix code, a quick response code, and a unique alphanumeric code pointing to the memory may be printed on a first portion of the inner layer of the tag. It is contemplated for the outer layer is transparent.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 3:
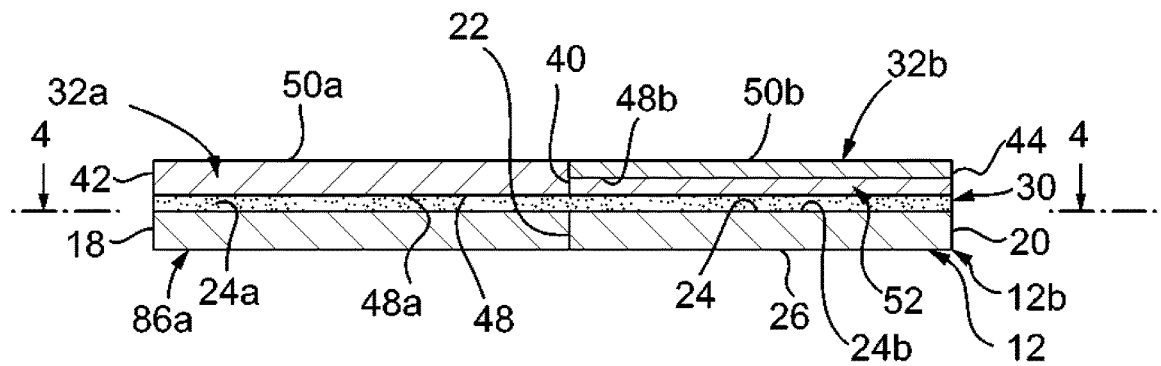
FIG. 3 is a cross-sectional view of the identification card of the present invention taken along line 3-3 of FIG. 1.
Figure 4:
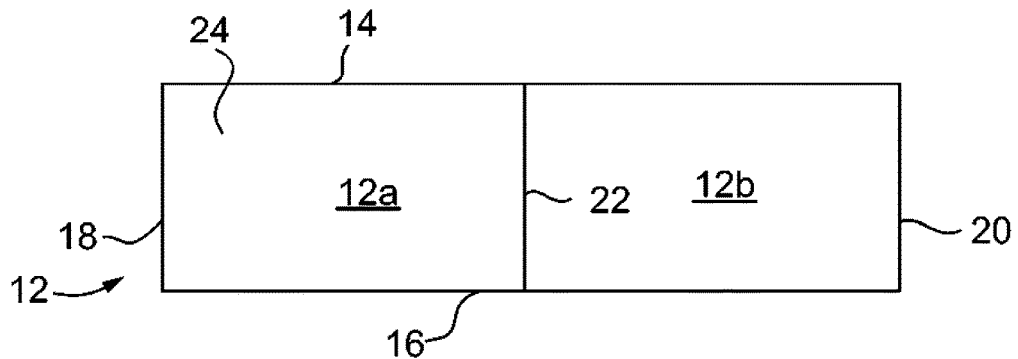
FIG. 4 is a cross-sectional view of the identification card of the present invention taken along line 4-4 of FIG. 3.
Figure 7:
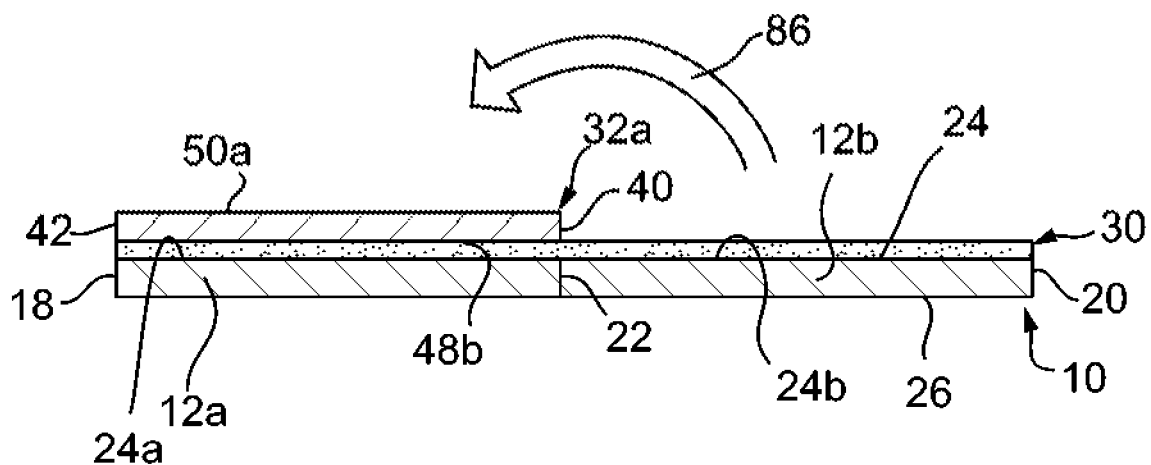
FIG. 7 is cross-sectional view of the identification card of the present invention, similar to FIG. 3, having a first portion of the top layer removed.

Referring to FIGS. 1-11, a tamper evident identification card, which allows for the tampering and/or altering of the identification card to be detected, is generally designated by the reference numeral 10. As best seen in FIGS. 3-4, identification card 10 includes a first outer transparent layer 12 formed from a generally clear or transparent material. Transparent layer 12 is defined by first and second spaced edges 14 and 16, respectively, and first and second spaced ends 18 and 20, respectively. A fold line 22 is transverse to first and second edges 14 and 16, respectively, at location generally equidistant from first and second ends 18 and 20, respectively. Fold line 22 is generally parallel to first and second ends 18 and 20, respectively, and divides transparent layer 12 into first and second portions 12a and 12b, respectively. In the depicted embodiment, transparent layer 12 has a generally rectangular configuration. However, other configurations are possible without deviating from the scope of the present invention.

Transparent layer 12 further includes an inner surface 24 and an outer surface 26. It is contemplated for first portion 24a of inner surface 24 associated with first portion 12a of transparent layer 12 to have a surface area approximately equal to the surface area of second portion 24b of inner surface 24 associated with second portion 12b of transparent layer 12. It is contemplated for outer surface 26 of transparent layer 12 to define a printable surface so as to allow desired information to be printed thereon. Adhesive 30 is provided on and is affixed to the entirety of inner surface 24 of the transparent layer 12, for reasons hereinafter described.

Figure 5:
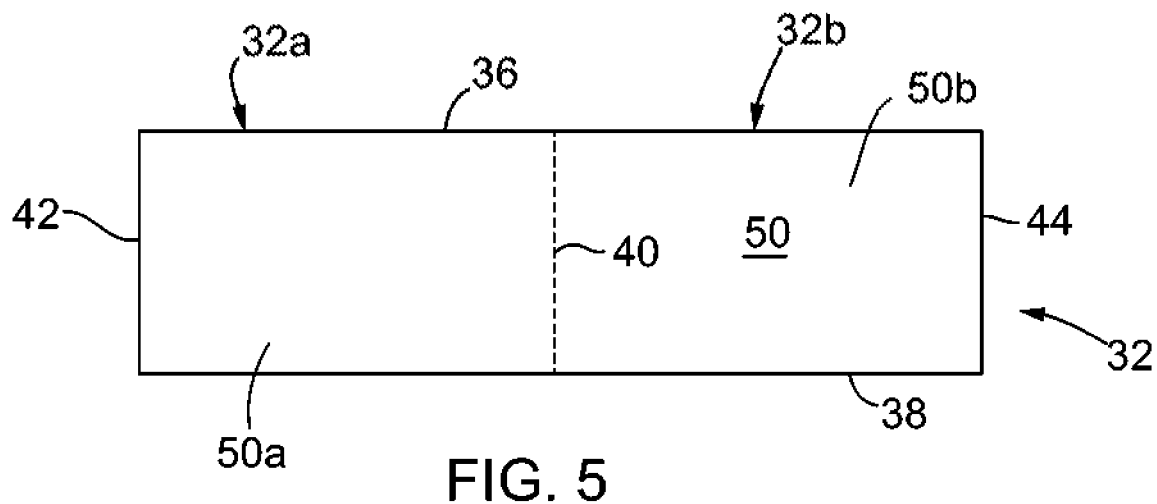
FIG. 5 is a top plan view of a top layer of the identification card of FIG. 1.
Figure 1:
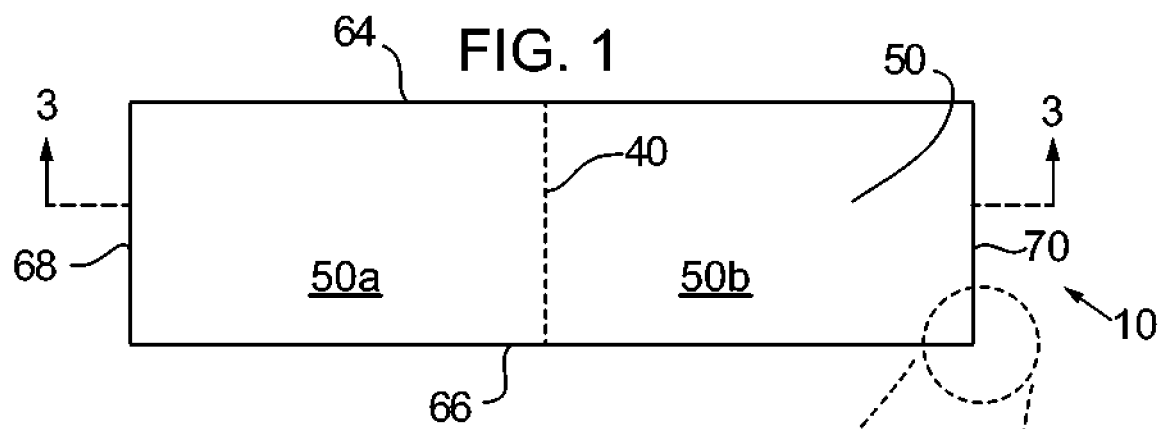
FIG. 1 is top plan view of an identification card in accordance with the present invention in an initial configuration.
Figure 2:
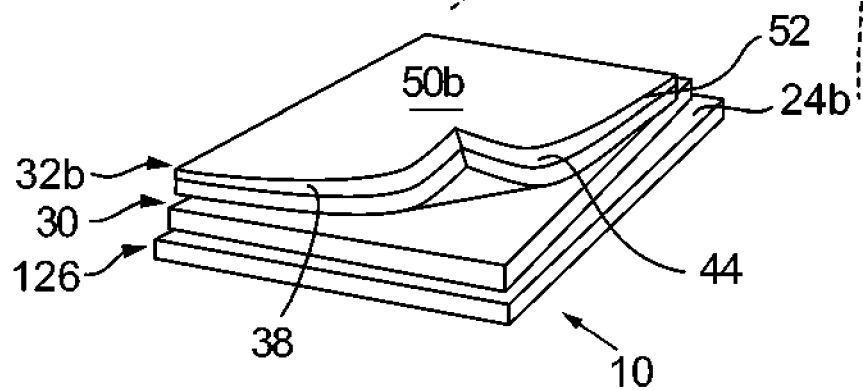
FIG. 2 is an enlarged isometric view showing the layers of the identification card of FIG. 1.
Figure 6:
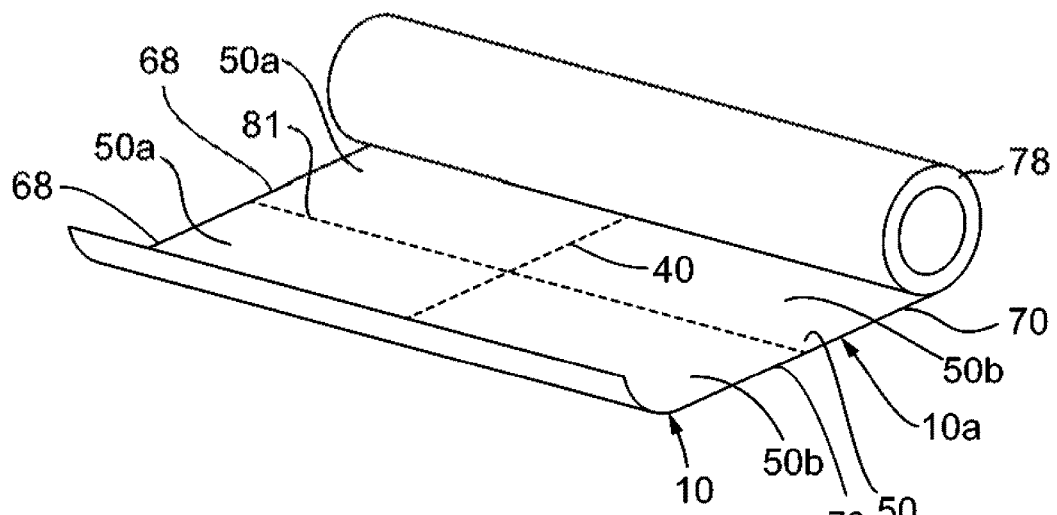
FIG. 6 is an isometric view of a rolled sheet of identification cards in accordance with the present invention.

As best seen in FIGS. 3 and 5, substrate 32 is positioned over transparent layer 12. Substrate 32 includes first and second spaced edges 36 and 38, respectively, and first and second spaced ends 42 and 44, respectively. A scored or perforated line 40 is transverse to and first and second edges 36 and 38, respectively, at a location generally equidistant from first and second ends 42 and 44, respectively. Perforated line 40 is generally parallel to first and second ends 42 and 44, respectively, and divides substrate 32 into first and second portions 32a and 32b, respectively.

Substrate 32 further includes an inner surface 48 and an outer surface 50. It is contemplated for a first portion 48a of inner surface 48 of substrate 32 associated with first portion 32a of substrate 32 to have a surface area approximately equal to the surface area of first portion 24a of inner surface 24 of transparent layer 12 and for a second portion 48b of inner surface 48 of substrate 32 associated with second portion 32b of substrate 32 to have a surface area generally equal to the surface area of second portion 24b of inner surface 24 of transparent layer 12. Silicone 52 or other non-binding material, e.g., wax or Teflon, is bonded to second portion 48b of inner surface 48 of substrate 32, for reasons hereinafter described. As described, substrate 32 has a generally rectangular configuration. However, other configurations are possible without deviating from the scope of the present invention.

It is contemplated for outer surface 50 of substrate 32 to be a printable surface so as to allow desired information to be printed thereon. Outer surface 50 of substrate 32 has first and second portions 50a and 50b, respectively. It is contemplated to print any desired information on first portion 50a of outer surface 50 of substrate 32, as required to associate identification card 10 with an individual, FIG. 11. By way of example, a machine-readable optical label, designated by the reference number 56, such as a barcode, a matrix code, a quick response code, and a unique alphanumeric code, may be printed on first portion 50a of outer surface 50 of substrate 32, as well as, other types of unique identifiers, such as a student identification code 56, as hereinafter described. In addition, an image 60 of the individual associated with identification card 10 also may printed on first portion 50a of outer surface 50 of substrate 32.

First portion 48a of inner surface 48 of substrate 32 is aligned with and positioned against the adhesive 30 bonded to first portion 24a of inner surface 24 of transparent layer 12 so as to bond first portion 32a of substrate 32 to first portion 12a of transparent layer 12. It is intended for the adhesive 30 to have sufficient adhesive characteristics such that once first portion 32a of substrate 32 is bonded to first portion 12a of transparent layer 12, first portion 32a of substrate 32 and first portion 12a of transparent layer 12 cannot be separated without damaging first portion 32a of substrate 32, and hence, identification card 10. Similarly, second portion 48b of inner surface 48 of substrate 32, has silicone 52 bonded thereto and is aligned with and positioned against the adhesive 30 bonded to second portion 24b of inner surface 24 of transparent layer 12 thereby releasably affixing second portion 32b of substrate 32 to second portion 12b of transparent layer 12. Silicone 52 or other non-binding material, e.g., wax or Teflon, prevents second portion 32b of substrate 32 from becoming permanently bonded to the adhesive layer 30. As such, it can be appreciated that silicone 52 on second portion 48b of inner surface 48 of substrate 32 allows for second portion 32b of substrate 32 to be removed from second portion 12b of transparent layer 12, for reasons hereinafter described.

Referring back to FIGS. 1 and 3, with substrate 32 bonded to transparent layer 12 as heretofore described, first edge 36 of substrate 32 and first edge 14 of transparent layer 12 define first edge 64 of identification card 10; second edge 38 of substrate 32 and second edge 16 of transparent layer 12 define second edge 66 of identification card 10; first end 42 of substrate 32 and first end 18 of transparent layer 12 define first end 68 of identification card 10; and second end 44 of substrate 32 and second end 20 of transparent layer 12 define second end 70 of identification card 10. In addition, perforated line 40 of substrate 32 is aligned with fold line 22 of transparent layer 12. As hereinafter described, it is contemplated to interconnect a plurality of identification cards, e.g., identification cards 10 and 10a in FIG. 6, in series to form a web or sheet of identification cards, generally designated by the reference numeral 78. Each identification card 10 is interconnected to an adjacent, subsequent identification card 10a along perforations 81.

Figure 10:
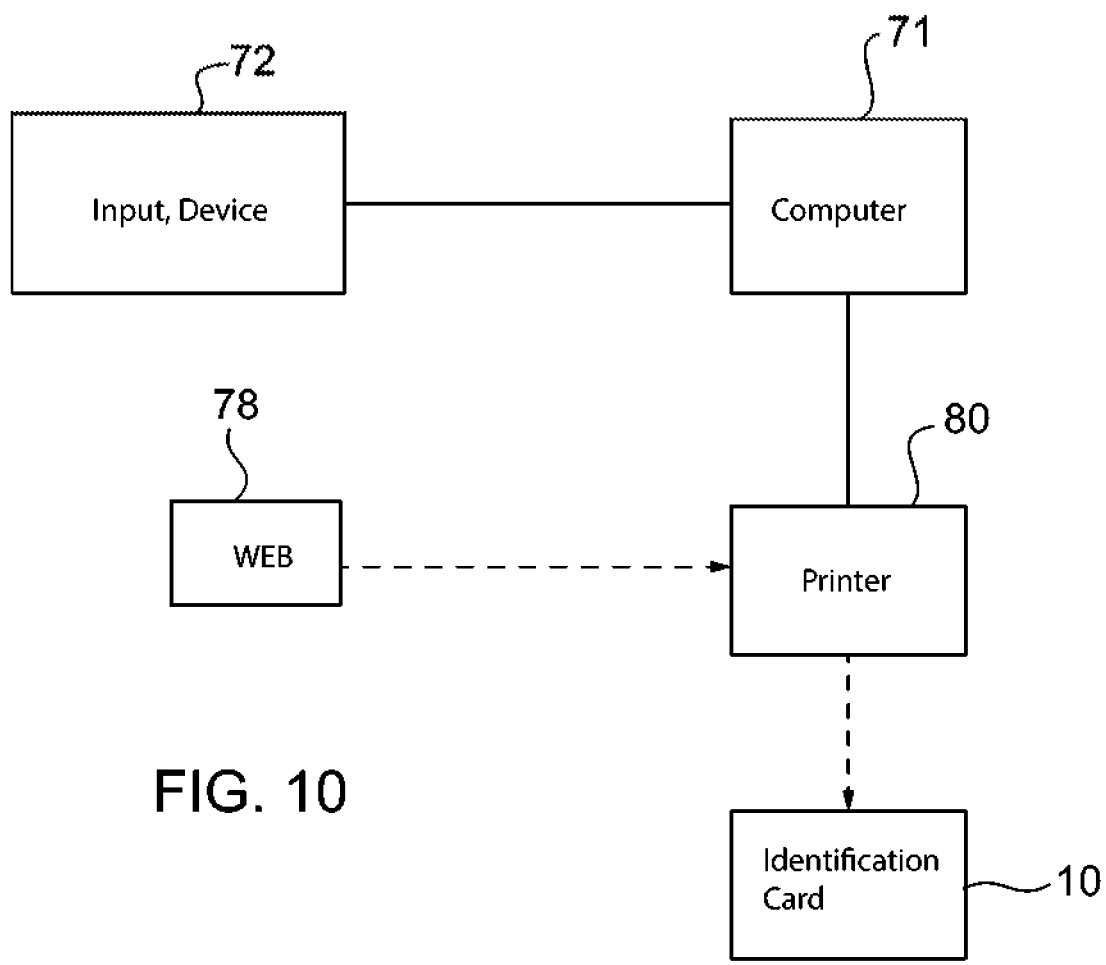
FIG. 10 is a schematic view showing fabrication of the identification card in accordance with the present invention.
Figure 11:
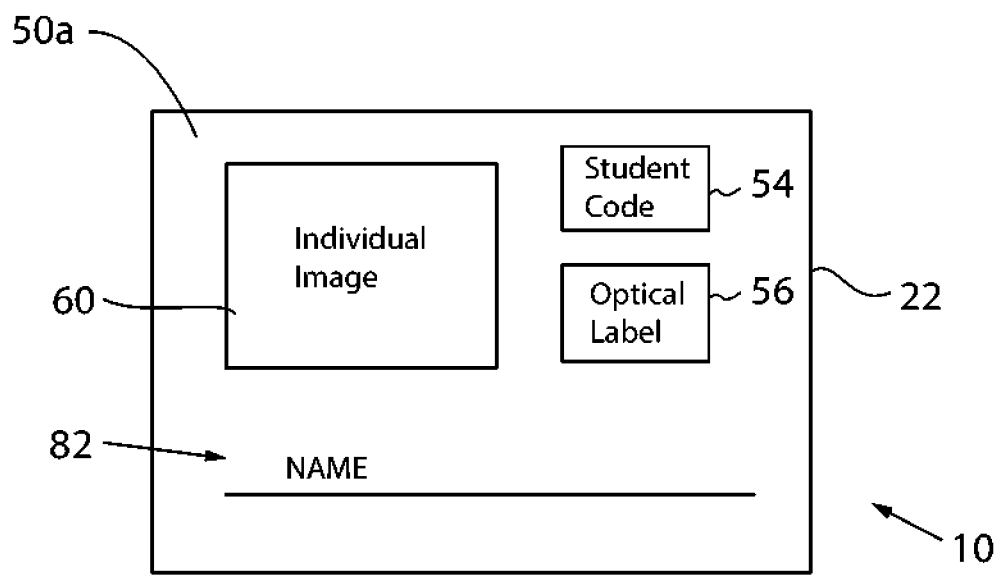
FIG. 11 is a top plan view of the identification card of the present invention in a second configuration depicting sample printing thereon.

Referring to FIG. 10, in order to generate identification card 10, items of information which relate to the identity of the bearer individual are entered into an electronic device, such as a computer or a network of computers, generally designated by the reference number 71, utilizing an input device 72, such as a keyboard, mouse, or the like, associated therewith. As is conventional, computer 71 processes data, typically in binary form, in accordance with a computer software program stored in a non-transient medium, and has memory to store data in a database or the like, as is conventional. More specifically, it is contemplated for the computer software program to cause computer 71 to store the items of information that are entered into computer 71 via input device 72 which relate to the identity of the bearer in the memory of computer 71 and to instruct ink jet printer 80 to print selected items of information on first portion 50a of outer surface 50 of substrate 32, as hereinafter described. By way of example, information such as an individual's name, address, birth date, signature, social security number, student number, passport number, a photographic image of the individual and biometric information associated with the person whose image appears in the photographic image (e.g., a fingerprint) may be entered into computer 71 utilizing input device 72 and stored, as heretofore described. In response to the receipt of the information or upon command by a user, computer 71 may generate student identification code 54 personalized to the individual, as well as, a machine-readable optical label 56, such as a barcode, a matrix code, a quick response code, and a unique alphanumeric code, that points to the memory of computer 71 wherein the information about the individual is stored.

In operation, a user may position web or sheet of identification cards 78, within the input of a conventional ink jet printer 80. As web or sheet of identification cards 78 is fed through ink jet printer 80, ink jet printer 80 prints selected or a predetermined set of items of information about an individual on first portion 50a of outer surface 50 of substrate 32. For example, ink jet printer may print an individual's name 82, address, birth date, signature, student number, photographic image of the individual 60 and biometric information associated with the person whose image appears in the photographic image (e.g., a fingerprint) on first portion 50a of outer surface 50 of substrate 32. In addition, student identification code 54 personalized to the individual, as well as, a machine-readable optical label 56, such as a barcode, a matrix code, a quick response code, and a unique alphanumeric code, that points to the memory of computer 71 wherein the information about the individual is stored may be printed on first portion 50a of outer surface 50 of substrate 32. Once the printing operation has been completed, identification card 10 may be torn from the web or sheet of identification cards 78 along perforations 81 and the process may be repeated to generate an identification card for a subsequent individual.

Figure 8:
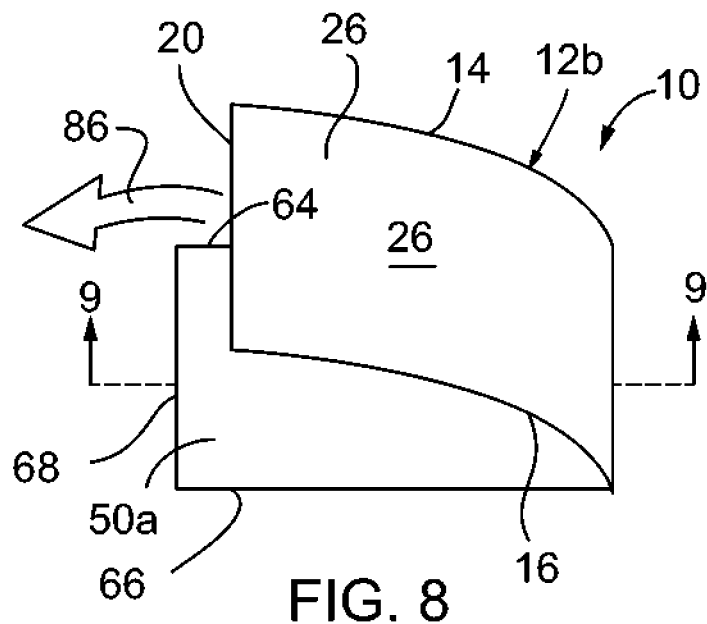
FIG. 8 is an isometric view of the identification card of FIG. 7 being folded into a second configuration.
Figure 9:
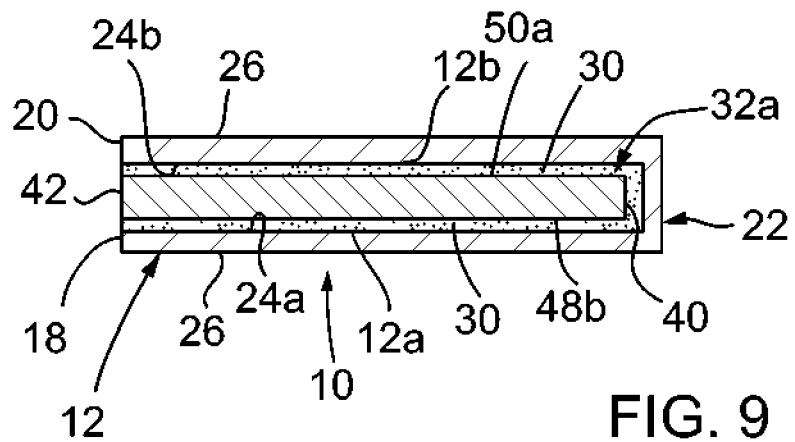
FIG. 9 is a cross-sectional view of the identification card of the present invention taken along line 9-9 of FIG. 8 showing the identification card in the second configuration.

Referring to FIGS. 8-10, once identification card 10 is removed from web or sheet of identification cards 78, second portion 32b of substrate 32 is removed from identification card 10 so as to expose adhesive 30 bonded to second portion 12b of transparent layer 12. Once second portion 32b of substrate 32 is separated from identification card tag 10, second portion 12b of transparent layer 12 is folded along fold line 22 over first portion 50a of outer surface 50 of substrate 32 in the direction shown by arrow 86. Once second edge 16 of transparent layer 16 is aligned with first edge 14 of transparent layer 12, second portion 12b of transparent layer 12 is brought into engagement with first portion 50a of outer surface 50 of substrate 32 such that second portion 12b of transparent layer 12 is bonded to first portion 50a of outer surface 50 of substrate 32 by adhesive 30. It is intended for the adhesive 30 to have sufficient adhesive characteristics such that once second portion 12b of transparent layer 12 is bonded to first portion 50a of outer surface 50 of substrate 32, transparent layer 12 and substrate 32 cannot be separated without damaging substrate 32, and hence, identification card 10.

Various modes of carrying out the invention are contemplated as being within the scope of the following claims particularly pointing out and distinctly claiming the subject matter, which is regarded as the invention.

I claim:

1. A method of forming an identification card for an individual, the method comprising the steps of:
    operatively connecting an input device to a computer executing a program stored in a non-transient medium;
    inputting selected items of information associated with the individual to the computer with the input device;
    storing the selected items of information on the memory associated with the computer;
    providing the identification card with inner and outer layers laminated to each other;
    printing identification information identifying the individual on a first portion of the inner layer of the identification card in response to a signal received by a printer from the computer;
    removing a second portion of the inner layer of the identification card to expose an adhesive on a first portion of the outer layer; and
    folding a first portion of the outer layer over the first portion of the inner layer so as to capture the first portion of the inner layer between the first portion of the outer layer and a second portion of the outer layer.

2. The method of claim 1 wherein at least one of the first and second portions of the outer layer is transparent such that the printing on the first portion of the inner layer is visible through the outer layer of the identification card.

3. The method of claim 1 wherein the first portion of the inner layer is bound to the second portion of the outer layer by the adhesive.

4. The method of claim 1 wherein the second portion of the inner layer has a non-binding layer of material affixed thereto.

5. The method of claim 3 wherein the material is one of silicone and wax.

6. The method of claim 1 wherein the selected items of information include at least one of a name, an address, a birth date, a signature, a social security number, a student number, a passport number, a photographic image of the individual and biometric information associated with the individual.

7. The method of claim 1 wherein the identification information includes at least one of a barcode, a matrix code, a quick response code, and a unique alphanumeric code pointing to the memory associated with the computer wherein the selected items of information are stored.

8. The method of claim 1 wherein the identification information includes at least one of a name, an address, a birth date, a signature, a student number, a photographic image of the individual and biometric information associated with the individual.

9. A method of fabricating an identification card for an individual, the method comprising the steps of:
    associating a unique code with at least one of a name, an address, a birth date, a signature, a social security number, a student number, a passport number, a photographic image of the individual and biometric information of the individual;
    printing the unique code on a first portion of an inner layer of the identification card, the first portion of the inner layer being bonded to a first portion of an outer layer of the identification card;
    removing a second portion of the inner layer from a second portion of the outer layer to expose an adhesive on the second portion of the outer layer; and
    contacting the exposed adhesive with the first portion of the inner layer so as to capture the first portion of the inner layer between first and second portions of the outer layer.

10. The method of claim 9 wherein the first and second portions of the outer layer are transparent.

11. The method of claim 9 wherein the second portion of the inner layer is coated with a releasable, non-binding agent.

12. The method of claim 11 wherein the non-binding agent is silicone.

13. The method of claim 10 wherein the first portion of the inner layer is free of the releasable, non-binding agent.

14. The method of claim 9 wherein the unique code is at least one of a barcode, a matrix code, a quick response code, and a unique alphanumeric code.

15. The method of claim 9 comprising the additional step of printing at least one of the name, the address, the birth date, the student number, the photographic image of the individual and the biometric information associated with the individual.

16. A method of fabricating an identification card for an individual, the method comprising the steps of:
    storing items of information associated with the individual on a memory;
    providing the identification card with inner and outer layers laminated to each other;
    operatively connecting the memory to a printer;
    printing with the printer at least one selected item of information on a first portion of the inner layer of the identification card;
    removing a second portion of the inner layer of the identification card;
    folding a first portion of the outer layer over the first portion of the inner layer such that the first portion of the inner layer is positioned between the first portion of the outer layer and a second portion of the outer layer; and
    affixing the first portion of the outer layer to the first portion of the inner layer.

17. The method of claim 16 further comprising the steps of:
    affixing an adhesive on the first portion of the outer layer; and
    affixing a non-binding layer of material to the inner surface of the second portion of the inner layer.

18. The method of claim 17 wherein the material is one of silicone and wax.

19. The method of claim 16 wherein the items of information include at least one of a name, an address, a birth date, a signature, a social security number, a student number, a passport number, a photographic image of the individual and biometric information associated with the individual.

20. The method of claim 19 wherein the at least one selected item of information is selected from the group consisting of the name, the address, the birth date, the signature, the student number, the photographic image of the individual and the biometric information associated with the individual.

21. The method of claim 16 includes the additional step of printing at least one of a barcode, a matrix code, a quick response code, and a unique alphanumeric code pointing to the memory on a first portion of the inner layer of the identification card.

22. The method of claim 16 wherein the outer layer is transparent.

* * * * *